(12) United States Patent
Gorshe (10) Patent No.: US 6,690,644 B1
(45) Date of Patent: Feb. 10, 2004

(54) MECHANISM FOR 1:1, 1+1, AND UPSR PATH-SWITCHED PROTECTION SWITCHING

(75) Inventor: Steven S. Gorshe, Beaverton, OR (US)

(73) Assignee: Zhone Technologies, Inc., Oakland, CA (US)

( * ) Notice: Subject to any disclaimer, the term of this patent is extended or adjusted under 35 U.S.C. 154(b) by 0 days.

(21) Appl. No.: 09/251,975

(22) Filed: Feb. 17, 1999

(51) Int. Cl.[7] ............................................. H04L 12/26
(52) U.S. Cl. ...................................................... 370/219
(58) Field of Search ................................ 370/216, 217, 370/218, 219, 220, 221, 222, 223, 224, 225, 228, 241, 242, 244, 256

(56) References Cited

U.S. PATENT DOCUMENTS

| | | | |
|---|---|---|---|
| 4,477,895 A | | 10/1984 | Casper et al. |
| 4,837,760 A | | 6/1989 | Reid et al. |
| 5,003,531 A | | 3/1991 | Farinholt et al. |
| 5,301,184 A | * | 4/1994 | Uriu et al. ............... 370/219 |
| 5,311,551 A | | 5/1994 | Eng |
| 5,408,462 A | | 4/1995 | Opoczynski |
| 5,535,191 A | | 7/1996 | Park |
| 5,550,805 A | | 8/1996 | Takatori et al. |
| 5,570,345 A | | 10/1996 | Kaprielian et al. |
| 5,572,513 A | | 11/1996 | Yamamoto et al. |
| 5,623,532 A | | 4/1997 | Houde et al. |
| 5,663,949 A | * | 9/1997 | Ishibashi et al. ......... 370/220 |
| 5,706,277 A | * | 1/1998 | Klink ....................... 370/220 |
| 5,731,887 A | | 3/1998 | Fee |
| 5,740,157 A | * | 4/1998 | Demiray et al. .......... 370/219 |
| 5,870,382 A | * | 2/1999 | Tounai et al. ............ 370/220 |
| 6,256,291 B1 | * | 7/2001 | Araki ....................... 370/216 |

* cited by examiner

*Primary Examiner*—Kwang Bin Yao
(74) *Attorney, Agent, or Firm*—Gray Cary Ware & Freidenrich; Edward B. Weller (57) ABSTRACT

A mechanism for 1:1, 1+1, and UPSR path-switched protection switching, particularly for optical interface units in synchronous optical network (SONET) multiplexer equipment. A working unit and a standby unit pair protect each other in the event of a failure of the working unit or the failure of the span connected to the working unit if both the working and standby units are connected to different spans. Each unit is made responsible for detecting failures of the span that it receives and is primarily responsible for detecting a fault within the unit's own hardware or software. When a unit or span failure is detected, switch control is localized to the two units (i.e. the working and standby unit) which eliminates the need for a third control unit, which reduces processing time and reduces the system hardware. Moreover, this feature allows distributed control of the system protection so that protection switching on multiple unit pairs can be performed in parallel rather than in a serial manner by a common control unit. Both unit and span failures are handled through the same signal pair and simple hardware.

26 Claims, 3 Drawing Sheets

MECHANISM FOR 1:1, 1+1, AND UPSR PATH-SWITCHED PROTECTION SWITCHING

BACKGROUND OF THE INVENTION

The present invention relates generally to a mechanism for 1:1, 1+1, and UPSR path-switched protection switching, and more particularly pertains to a fast, reliable mechanism for such path-switched protection for optical interface units in synchronous optical network (SONET) multiplexer equipment.

Protection switching apparatus and methods are well known in the prior art. In telecommunications systems where reliability is critical it is common to have a working unit that is performing the desired functions (i.e. in-service) and a redundant standby unit that is available to take over the working unit's functions if the working unit either fails or is manually removed from service. Whenever a module failure occurs it is desirable to get a failed module off-line as quickly as possible. It is desirable to effect the necessary switching to get the failed module off-line and a good module on-line with minimum delay to prevent the loss of data. Conventional methods typically employ some type of controller monitor unit which monitors the faults present in the working module, and if a fault is detected, signals the corresponding standby module, which in turn provides the protection switching. Controller monitor units, however, suffer from excessive switching delays.

It is therefore desirable to substantially reduce the time delay between the detection of a module failure and the completion of a replacement module being brought on-line, while guaranteeing that only one unit can be on-line (e.g. working) at a time and that a failed unit can always be removed from service.

The present invention, although not limited to SONET and optical technologies, allows a working optical interface unit and a standby optical interface unit pair in a Synchronous Optical Network (SONET) or a Synchronous Digital Hierarchy (SDH) to protect each other in the event of a failure of the working unit or the failure of the span connected to the working unit if both the working unit and the standby unit are connected to different spans.

SONET (Synchronous Optical Network) is a standard for optical data transport. It defines optical signals and a synchronous frame structure for multiplexed digital traffic. It is a major contender as the physical transport layer for the next decade. SONET/SDH is an International standard which has been adopted in the United States, Europe, and in Japan. It provides necessary bandwidth for today's networks and can grow to accommodate the networks of the future. It provides advanced fault tolerance and survivability.

The present invention is concerned with Automatic Protection Switching (APS) equipment which concerns the ability of a network element to detect a failed working unit or line and switch the service to a spare (protection) unit or line. 1+1 APS pairs a protection unit or line with each working unit or line. 1:n APS provides one protection unit or line for every n working units or lines.

Having one standby unit available to protect one working unit is called 1:1 protection. If both the working and standby units are connected to separate spans (facilities) and both send and receive nominally the same signal, then the receiving terminal can choose to take its received data from either the working or standby unit. This configuration is referred to as 1+1 protection, and is used for point-to-point linear connections between two terminals. An extension to 1+1 protection is unidirectional Path-switch rings (UPSRs) where the working unit terminates a span for one direction of the ring and the standby unit terminates the span for the other direction of the ring. Both units place the same data onto the ring and, in a fault-free network, receive the same data from the two directions of the ring. Rather than taking all of the data from one of the spans, Path-switching selects the best Path (i.e., direction of the ring) for the received data on a pertributary basis, allowing some of the tributaries to be taken from one span and some from the other. This invention covers all of these cases with the same basic set of signal lines and the same system control model.

SUMMARY OF THE INVENTION

Accordingly, it is an object of the present invention to provide a fast reliable method that allows units to be protected in single unit, span, and ring configurations in a fast and reliable manner.

It is a further object of the present invention to guarantee that only one unit can be on-line (working) at a time and that a failed unit can always be removed from service.

The present invention provides the following novel features.

1) Simple hardware interface that allows very fast 1:1, 1+1, and UPSR Path switching protection with a consistent operation model for all three types of operation.

2) Layered approach allows using a subset of the signals instead of all of the signals by relying on system software to prevent conflicts, or the full set of signals to simplify the system software.

3) With full interface, all conflicts between units are resolved in hardware in a logical manner that prevents damage to either of the two units.

4) A failed unit can always be removed from service.

5) Units respond purely to their inputs and do not need to store state information. (In other words, units do need to have state machines that keep track of previous states. This feature greatly simplifies the system design and control.)

6) UPSR Path protection switching implemented as a hardware handshake between the optical interface units, which allows each unit to keep track of only its own provisioning information. (Typically, this function is implemented on a separate unit, such as a time-slot interchange unit, by having the data from both Paths available to both units so that only one unit is in-service, or by having both units aware of each others' provisioning.)

7) The combination of hardware to perform the real-time-critical switching and using system software to control things that aren't as speed critical (e.g., reversion control and protection due to degraded signal conditions). The preferred implementation for degraded signal applications is to have the software on the interface units handle all protection switching control by exchanging messages between the units.

8) Switch control (except for reversion control) is localized to the two units (i.e., the working and standby unit). This feature eliminates the need for a third control unit, which reduces processing time and reduces the system hardware. More importantly, this feature allows distributed control of the system protection so that protection switching on multiple unit pairs can be performed in parallel rather than in a serial manner by a common control unit.

9) Unit failure, span failure, and unit removal are all handled through the same signal pair and simple hardware.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE INVENTION

The terminology used here is explained as follows. A unit is In-Service (IS) if it provisioned to be the working (on-line) unit. A unit is In-Service Standby (IS-STBY) when it is provisioned as the standby unit and has all of the provisioning that it needs in, order to take over from the working unit. An Out-Of-Service (OOS) unit is not provisioned to be able perform its functions. An additional sub-state for standby units is Protection Switch Inhibit (PSI). When PSI is set, the standby unit is prevented from taking over for the working unit (i.e., from performing a protection switch).

In revertive operation, service is switched back from the standby unit to the original working unit after the fault condition has been cleared and a predefined Wait-to-Restore (WTR) time has expired. In non-revertive switching, the standby unit becomes the working unit and the original working unit becomes the new standby unit and they remain in that state even after the fault clears (i.e., they do not revert to their previous states).

It is critical in 1:1, 1+1, and UPSR Path protection that the working and standby units do not simultaneously drive data onto the same backplane PCM (Pulse Code Modulation) bus. This situation causes the data on the backplane to be meaningless, and will eventually damage or destroy the bus driver components on the units.

2. Protocol Description (Including Partitioning Between Unit Hardware and System Software)

The protocol can be summarized as follows. Each unit is responsible for detecting failures of the span over which it receives PCM data and is primarily responsible for detecting a fault within the unit's own hardware or software. For example, watchdog timers may be used to detect unit software/firmware failures. When unit (or span) failures are detected, the working unit indicates its failed status to the standby unit. The standby unit, meanwhile, indicates to the working unit whether it is capable of taking over the on-line functions in a protection switch. If the standby unit is capable of taking over for a working unit failure, it will do so immediately after seeing the failure indication from the working unit. The working unit drops off-line immediately after indicating its failure to a standby unit that indicates it is available for the switch. Otherwise, the working unit remains on-line in a keep-alive mode such as outputting an AIS (Alarm Indication Signal) on the PCM buses and span. In this manner, the real-time critical portion of the switch is handled very quickly in the hardware interface between the two units. When the standby unit takes over, it sends a message to the system controller (SCU) to inform it of the switch event. The system software on the SCU then re-provisions the standby unit to be IS and (if possible) re-provisions the unit detecting the failure to be either IS-STBY or OOS, depending on the nature of the failure.

When the failure clears, the unit that originally detected the failure informs the SCU system software that it is capable of performing its functions. If the system is provisioned for non-revertive operation, the SCU will keep the units provisioned as they are until such time as the current on-line unit detects a failure. If the system is provisioned for revertive operation, the SCU begins a WTR timer in order to insure that the failure has really cleared. After the WTR timer expires, the SCU re-provisions the original working unit to be IS and the standby unit to be IS-STBY again.

Specifically, the following sequence of steps is followed to establish the switch when the failed unit detects its own fault:

1) The IS unit detects the unit failure.

2) The IS unit indicates its failure state to the partner and quits placing all data (e.g., PCM) onto the backplane (and quits transmitting data on the span for 1:1 cases).

3) The partner (standby) unit detects the failure of the IS unit and begins placing PCM onto the PCM buses. (If the partner unit has also failed or has its protection switching inhibited, then a double-failure case exists and there is no requirement to handle double-failure cases.)

4) The partner unit informs the SCU of the switch event.

5) The SCU provisions the IS unit to be IS-STBY (if it is possible to do so).

6) The SCU provisions the partner unit to be IS.

NOTE—Step 6 can optionally be performed before step 5 with the full hardware handshake implementation.

If the system is provisioned for non-revertive switching for these units then the switch is complete.

The following sequence is followed when the SCU detects the failure (or removal) of a unit.

1) The SCU sends a message to the failed unit (if possible) to inform it that it is being protected. This message attempts to move the unit from an in-service to an out-of-service state.

2) The SCU commands the failed working unit to go off-line (i.e., stop transmitting data on the PCM buses and disconnect itself from its metallic interface).

3) The SCU commands the failed unit's protection unit to disconnect the failed unit from the metallic interface signals and connect its own circuits to the metallic span interface (if both units share the same span), and begin transmitting data onto the PCM buses.

The following sequence of steps is followed to establish the switch when the on-line unit detects a span failure in a 1+1 configuration.

1) The IS unit detects the span failure.

2) The IS unit checks the hardware handshake line (PABLE, FIG. 1) to determine whether the partner unit is capable of carrying valid traffic.

3a) If the partner unit is unable to carry traffic, then the IS unit indicates its failure state to the partner and places AIS onto the PCM buses and the transmit span. In this situation, the sequence terminates here and Steps (4)–(7) are not followed.

3b) If the partner unit is capable of carrying valid traffic, then the IS unit indicates its failure state to the partner (through the hardware handshake lines) and quits placing all PCM data onto the backplane (and quits transmitting data on the span for 1:1 cases).

4) The partner unit detects the failure of the IS unit and begins placing PCM onto the PCM buses (and transmit data on the span for 1:1 cases).

5) The partner unit informs the SCU of the switch event.

6) The SCU provisions the IS unit to be IS-STBY.

7) The SCU provisions the partner unit to be IS.

NOTE—Step 7 can optionally be performed before step 6 with the full hardware handshake implementation.

If the system is provisioned for non-revertive switching for these units then the switch is complete.

If the system is provisioned for revertive action, then following restoration sequence is followed for both 1:1 and 1+1 switching.

1) The failure clears (i.e., the failed unit recovers or is replaced, or, if relevant, the span failure clears) and the restored/replaced unit informs the SCU of its healthy status.

2) The SCU begins a Wait-to-Restore (WTR) timer.

NOTE—For facility-related conditions, the units may optionally perform their own WTR timer function rather than having the SCU perform it. Specifically, when a unit detects the clearing of a failure, it would begin a WTR timer and sends a message to the SCU when that timer expires. The SCU is then responsible for controlling the reversion operation per steps 3) and 4).

3) When the WTR timer expires, the SCU provisions the IS unit (i.e., the unit that went to IS after the protection) to be IS-STBY.

4) The SCU provisions the restored/replace unit (i.e., the original IS unit) to be IS again.

Abnormal situations are those in which it is not possible for some reason to perform the above operations. The situations and their resolution are as follows.

1) The failed unit is not capable of detecting its failure and loses communication with the SCU.

The result would be the inability to perform the protection switch, but proper design should catch these situations. The PST signals discussed below provide a mechanism to complete the switch.

2) The SCU "gets lost" and accidentally provisions both units to be IS at the same time.

This situation would potentially damage the PCM drivers on both units if the condition persisted long enough without resolution. The PST signals discussed below resolve the conflict by insuring that the last unit to be provisioned IS will be the actual on-line unit.

3) A unit that was not the IS unit goes "crazy" and decides that it is really the IS unit.

The PST hardware handshake line and SCU intervention are used to recover from this situation.

4) A double span failure occurs (e.g., due to a cable cut) and the partner unit detects the failure after the IS unit detects it.

The abnormal situation here occurs if the partner unit detects the failure after informing the SCU of the protection switch and before the SCU re-provisions the IS unit to be IS-STBY. The result will be that the switch will bounce back to the original IS unit and then be transferred back to the partner unit as the SCU re-provisions both units. As long as the switch is stable within 50 ms, this bounce is not a problem.

3. Hardware Interface and Circuits

Figure 1:
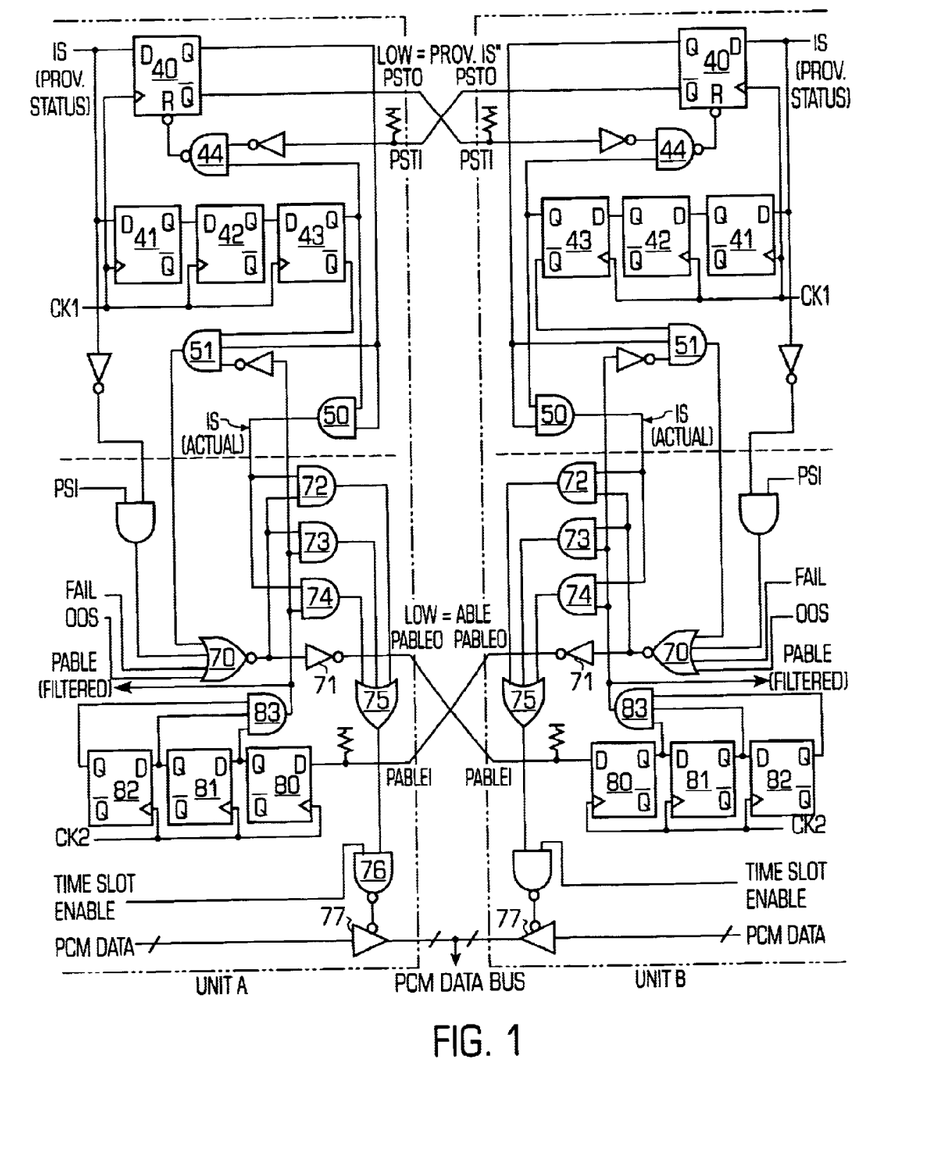
FIG. 1 is a circuit schematic illustration of an exemplary embodiment of a protection switching circuit pursuant to the present invention.

FIG. 1 is a circuit schematic illustration of an exemplary embodiment of a protection switching circuit pursuant to the present invention. As shown in FIG. 1, the invention uses two sets of two signal lines (four lines total-two PABLE lines and two PST lines) between the working/standby unit pair for 1:1 and 1+1 protection. The criteria for the values driven on these signal lines and the responses to the inputs on these lines is summarized in Table 1. The timing diagrams for the FIG. 1 circuit are provided in FIG. 2, and shows the basic timing diagrams for IS (in service) resolution.

The first set of signal lines are referred to in the Figures as PABLE (Partner Able). It is noted that the PABLEO (Output) for unit A forms the PABLEI (Input) for unit B, and vice versa. A unit outputs an active low state whenever it is able to perform the functions of that unit. The responses a unit makes to the PABLE state are summarized in Table 1, and referred to above as the failure indication between two units. A unit is not able to perform its functions under the following conditions:

IS Unit:
  Unit failure detected (e.g., through watchdog timer expiring, hardware-detected failure, or software detected failure).
  Unit removal (detected by pull-up on the PABLE input of the partner unit).
  Span failure (applies only to 1+1 protected units or 1:1 protected units where the IS-STBY unit is capable of performing on-line monitoring of the received signal so that it sees span failures at approximately the same time as the IS unit).

IS-STBY:
  Unit failure detected
  Unit removal
  Protection switch inhibit (PSI) is set
  Span failure (if applicable)

OOS:
  OOS units can not carry traffic or perform their functions and always indicate this state.

The second set of signals (PST) allow the two units to communicate their in-service Provisioning State (PST). It is noted that the PSTO (Output) for unit A forms the PSTI (Input) for unit B, and vice versa. A unit sets its PST output signal active low when it is provisioned IS. Since a failed unit may not be capable of resetting itself to OOS, it is desirable to allow the partner unit to be capable of removing a unit from its effective IS status. The PST signals and their associated circuitry are implemented such that the last unit to be provisioned IS will always take over and be the only actual IS unit. The signal in FIG. 1 labeled "IS (provisioned)" is active high when the unit has been provisioned IS. The signal in FIG. 1 labeled "IS (actual)" is the signal that the unit actually uses as its IS status indication (active high indicating IS). Thus, while the unit's provisioning may still indicate an IS state, the unit's actual IS state can be reset by the partner unit. If the system software in the system controller (SCU) wants to restore the original unit to IS, it does so by taking that unit to an IS-STBY or OOS state and then re-provisioning it to IS, at which point it will reset the partner's IS actual state.

Figure 2:
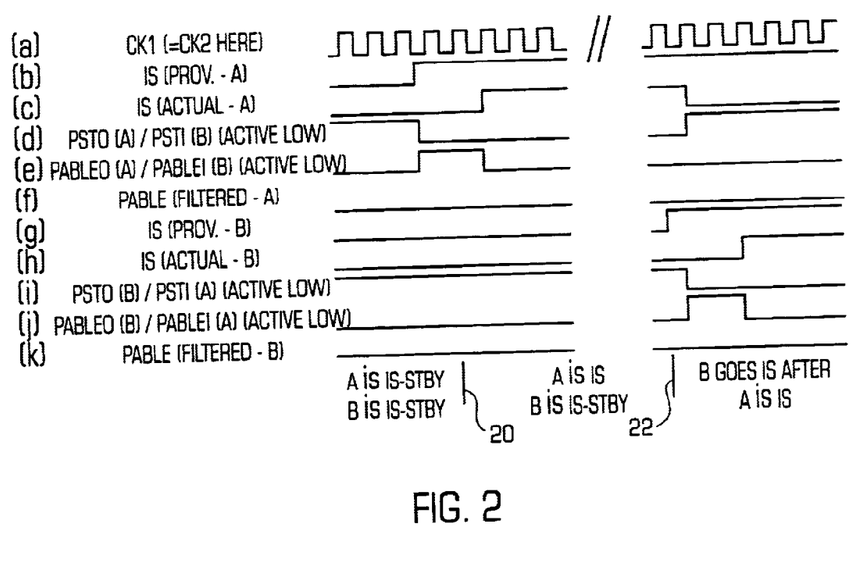
FIG. 2 illustrates timing waveform diagrams for the circuit schematic of FIG. 1, and shows the basic timing diagrams for IS (in service) resolution.

The timing diagrams of FIG. 2 illustrate the signals of the protection circuit of FIG. 1, and illustrate the signals of the protection circuit in three states, proceeding from the left, A is IS-STBY and B is IS-STBY, and at the timing point 20, the states shift to A is IS, while B remains IS-STBY, and at the timing point 22, the states shift to B goes IS after A is IS.

Table 1 illustrates the states of the signals of the protection circuit of FIG. 1, with the signals of the protection circuit of FIG. 1 being shown across the top of the Table, and the provisioned state of a unit being illustrates in the left column as respectively IS, IS-STBY, and OOS, and the Response/Action of the units being illustrated in the right column.

unit goes to IS, the partner unit must be able to filter out a one or more clock period wide high pulse on the PABLEI signal. The pair of flip-flops 10,12 on the PABLEI receiving circuit in FIG. 1 perform this function. This reset-disable detection must be qualified, however, when the unit going IS has been protecting its partner. Until a unit has enabled its PSTO to be reset, it is not actually IS. As seen in Table 1, a unit that is IS-STBY and detects its own failure goes off-line.

TABLE 1

Table of inputs, outputs, states, and responses

| State | | | Inputs | | Outputs | | |
|---|---|---|---|---|---|---|---|
| Prov. State | Failure | PSI Status | PABLE Input | PST Input | PABLE Output | PST Output | Response/Action |
| IS | None | — | — | High | Low | Low | Unit is on-line unit (normal operation) |
|  | None | — | — | Goes low | Low | Goes high | The partner has forced the unit out of its IS status. |
|  | None | — | — | Low | Low | High | Unit forced off-line by partner and yields service to partner. |
|  | Failure | — | High | High | High | Low | Partner not capable of taking over, so unit performs keep-alive (e.g., output AIS on span and PCM bus) |
|  | Failure | — | Low | High | High | Low | Unit yields to standby unit |
|  | Failure | — | — | Goes Low | High | Goes high | The partner has forced the unit out of its IS status. |
|  | Failure | — | — | Low | High | High | Unit forced off-line by partner and yields service to partner. |
| IS-STBY | None | off | Low | Low | Low | High | Unit is standby unit and able to protect (normal operation) |
|  | None | off | Low | High | Low | High | Unit is standby, but partner has not been provisioned IS. (No action.) |
|  | None | off | High | — | Low | High | Standby unit takes over for partner unit. |
|  | None | Set | — | — | High | High | Protection switching is inhibited, so standby unit stays off-line. |
|  | Failure | — | — | — | High | High | Standby unit stays off-line due to its own failure. |
| OOS | — | — | — | — | High | High | OOS unit stays off-line. |

The circuits of FIG. 1 include protection against transient conditions when the unit's provisioning is changed from IS-STBY to IS. A unit waits for one or more clock periods after asserting its PSTO signal low before enabling itself to have its PSTO (and therefore its actual in-service state) reset by its partner, as illustrated by FIGS. 2(*b*), (*c*), (*d*) and (*e*), and also by FIGS. 2(*g*), (*h*), (*i*) and (*j*). This one or more clock period delay eliminates a race condition between an IS unit being reset and the unit going IS. There is a remote possibility that a unit's clock circuit could fail immediately after asserting PSTO low and before allowing its PSTO to be reset (i.e., during this one or more clock period delay). That reset-disabled condition is detected in the logic of FIG. 1 as an assertion of PSTO without enabling the resetting of PSTO. The condition is regarded as a unit failure and is signaled accordingly on PABLEO. Since, in normal operation, this reset-disable condition is signaled as a failure on PABLEO for one or more clock period every time that a Thus, the transient reset-disable "failure" detection when a unit goes IS would cause a unit that has been protecting a failed partner unit to go off-line during that one or more clock period delay after it asserts PSTO. To eliminate this situation, the reset-disable failure condition is masked off whenever the partner unit indicates a failure condition. In other words, if the partner unit is indicating a failure condition, then a unit going to IS ignores the potential failure condition where PSTO is asserted and not enabled to be reset.

The PABLE and PST lines can either be cross-connected or straight-connected. Cross-connected signals use the same backplane connector pin as the output for each unit and the same pin for an input (different from the output pins). For example, pin A1 is the output from both units and pin A2 is the input, where pin A1 of unit A is connected to pin A2 of unit B and pin A1 of unit B is connected to pin A2 of unit A within the backplane. Straight-connected signals, for example would connect pin A1 of unit A to pin A1 of unit B so that one unit uses that pin as an output and the other uses it as an input.

Figure 3:
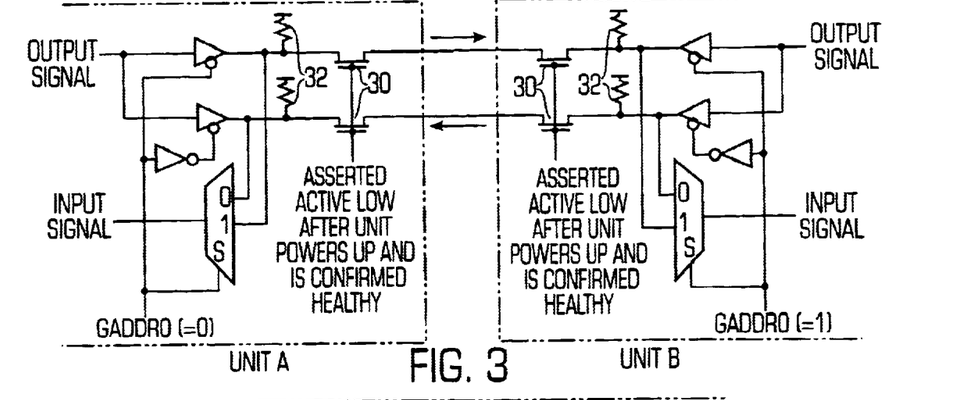
FIG. 3 is a circuit which shows how straight-connected signals are handled to resolve which unit uses a signal as an output and which unit uses the signal as an input.

The circuit of FIG. 3 shows how the straight-connected signals are handled to resolve which unit uses a signal as an output and which uses it as an input. Note that some form of isolation (e.g., the FET 30 shown in FIG. 3) is needed so that the pull-up resistor 32 of the newly-inserted unit doesn't actually pull down on that signal during unit power-up.

The following is a brief description of the functions of the components, gates and signals of FIG. 1. The PABLE signal is formed by the ORing (NOR gate 70 and inverter 71) of the various conditions that indicate the unit is unable to perform its functions, as described above under the headings IS Unit, IS-STBY, and OOS. The various ORED conditions include, 1) the output of AND gate 51, as described below,
2) IS (in service-prov.) ANDed with PSI (protection switch inhibit),
3) FAIL (unit failure), and
4) QOS (unit out of service).

Flip flop 40 is the source for the PSTO (provisioned state output) signal. The input to flip flop 40 is the IS provisioned status of that unit. The actual IS state of the unit is determined by the output of AND gate 50, which is true whenever the non-inverted outputs of flip flops 40 and 43 are true. Flip flop 40 is capable of being asynchronously reset by the PSTO signal from the partner unit so that the partner unit can force its reset, hence resetting the actual IS state of the unit. As illustrated in the timing diagrams of FIG. 2, when a unit is initially provisioned IS [FIGS. 2(b) and 2(c)], flip flop 40 registers this state on the next clock [FIGS. 2(c) and 2(h)], while flip flops 41, 42 and 43 provide a delayed indication of the provisioned state. Since a unit's flip flop 40 can only be asynchronously reset when the output of flip flop 43 is true, the delay through flip flops 41–43 allows the completion of the reset of the partner unit's flip flop 40 (and hence the resetting of the partner's PSTO signal) before enabling its own flip flop 40 to be reset. An asynchronous reset is desirable for flip flop 40 so that it still may be reset if its clock source (CK1) has failed. As an added security, AND gate 51 provides an indication of when the IS provisioning has been clocked into flip flop 40, but its reset is not yet enabled. If CK1 failed in this transition period, the unit would have failed and it would not be able to be reset. This transitory condition is used as a failure input to NOR gate 70. Each unit has a chain of flip flops 80, 81, and 82 together and AND gate 83 in the PABLE (partner able) inputs that act to filter this transitory "failed" condition indication from the partner unit.

A unit is enable to place PCM data onto the backplane (or onto a shared facility) only under the following conditions: (1) The unit is IS and has no failure conditions; (2) The unit is IS-STBY, has no failure conditions, and its partner unit indicates (through the PABLE signal) that it is not capable of performing the on-line functions; and (3) The unit is IS, has a failure condition, and its partner indicates (through the PABLE signal) that it is not capable of taking over. In the third case, the unit outputs an alarm indication signal (AIS). Gates 72, 73, 74, and 75 provide the logic to implement this enable function. Gate 76 provides the normal time slot enable to the tri-state output drivers such as 77.

4. UPSR Path-Switching Operation

The 1+1 protection switching technique is an example of Line-switching. With Line-switching, all of the data placed onto the system PCM buses comes from one of the two lines (i.e., either the working span or the protection span). Since one unit interfaces to one span and the other unit interfaces to the other span, the Line-switch is accomplished by changing which unit is on-line. With Path-switching, however, the PCM data can be taken from either of the two spans. When a UPSR node adds data to the ring, it transmits that same data in both directions around the ring (i.e., on both spans). The node that drops that data from the ring therefore can take the data from either ring direction/span (i.e., from either Path). Since each unit interfaces to only one span, the pair of units must time-share the PCM bus in order to allow some Paths to be taken from each ring direction. The time sharing assumes that both units share a common frame reference so that they both associate the same data stream (e.g., VT1.5 #1) (Virtual Tributary) with the same PCM bus time slot. Path-switching can be performed on either a per-VT or per-STS-1 (Synchronous Transport Signal) basis in SONET systems. VTs are used in the examples here.

Figure 4:
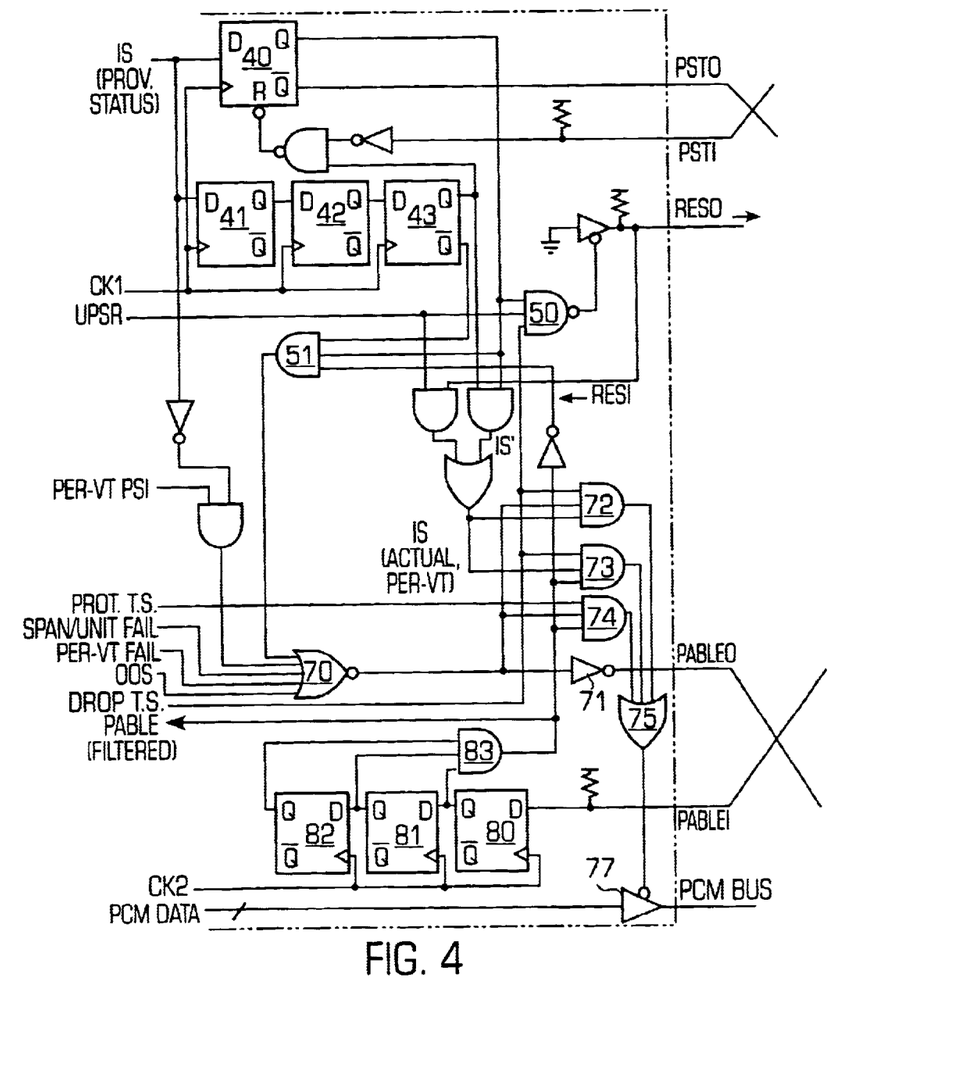
FIG. 4 is a circuit schematic implementation for UPSR path switching.

FIG. 4 is a circuit schematic implementation for USRP path switching. The circuit of FIG. 4 is similar in many respects to the left side circuit of FIG. 1, and the description of the functions thereof is applicable to FIG. 4. As shown in FIG. 4, the same basic signal set (two PABLE lines and two PST lines) used for unit and 1+1 protection can be used for Path-switching. One additional signal line (RES) between the units is useful, however, to resolve potential provisioning conflicts. Here, the PABLE and PST signals are used in the same manner as before, except that failures are now signaled on the PABLE line on a per-VT basis in addition to the span and unit failures.

There are three possible provisioning states for each VT, as illustrated in Table 2. A unit is either provisioned (A) to drop that VT onto the PCM bus (B), protect that VT by dropping it if the partner unit indicates a failure, or (C) to stay off the PCM bus for that VT in all circumstances. Note that with the state encoding shown in Table 2, the least significant state bit corresponds directly to the "Prot.T.S." (protect time-slot) signal in FIG. 4 and the most significant state bit corresponds directly to the "Drop T.S." (drop time-slot) signal in FIG. 4. The desired system state table for each VT is shown in Table 3. PSI is not included in Table 3 since its result is clear (i.e., a unit provisioned for PSI always indicates a "failure" for that VT to its partner on the PABLE lines and never drops the data). Note that unit-level PSI is implemented here by signaling failure for all VTs through the PABLE line.

TABLE 2

VT Provisioning States for UPSR

| State | Recommended Encoding | State Description and Result |
|---|---|---|
| A | 00 | Protection switch inhibit (PSI) (i.e., stay off the PCM bus regardless of PABLEI and PSTI status). |
| B | 01 | Protect VT if partner indicates failure |
| C | 10 | Provisioned to drop VT |
| D | 11 | Unused |

TABLE 3

System VT State for UPSR

| Unit A Prov. Failure | | Unit B Prov. Failure | | |
|---|---|---|---|---|
| Status | Status | Status | Status | Desired Result |
| Drop | OK | Prot. | OK | A drops (normal operation) |
| Drop | OK | Prot. | Fail | A drops |
| Drop | Fail | Prot. | OK | B drops (protection switch) |
| Drop | Fail | Prot. | Fail | A drops AIS |
| Prot. | OK | Drop | OK | B drops (normal operation) |
| Prot. | OK | Drop | Fail | A drops (protection switch) |
| Prot. | Fail | Drop | OK | B drops |
| Prot. | Fail | Drop | Fail | B drops AIS |
| Prot. | OK | Prot. | OK | No one drops |
| Prot. | OK | Prot. | Fail | Ideally, no one drops, but it is acceptable for Unit A to drop. |
| Prot. | Fail | Prot. | OK | Ideally, no one drops, but is acceptable for Unit B to drop. |
| Prot. | Fail | Prot. | Fail | No one drops |
| Drop | OK | Drop | OK | Last unit provisioned IS drops |
| Drop | OK | Drop | Fail | * |
| Drop | Fail | Drop | OK | * |
| Drop | Fail | Drop | Fail | Last unit provisioned IS drops AIS |

* Here, if the last unit provisioned IS is the one detecting the failure, then it is either a transient condition as provisioning is changed or the result of a failure on the other unit. In view of this circumstance, it is acceptable for either no one to drop or for one of the units to drop AIS. In the RES implementation shown in FIG. 4, the last unit provisioned IS will drop AIS.

In normal, stable operation, only one unit is provisioned to drop each VT and one unit is provisioned to protect each VT. Table 3 covers the transient or failure events where both units are provisioned to drop or to protect. The event that both units are provisioned to either drop or protect will most typically occur when there is a provisioning change that effectively creates a manual protection switch. As long as no more than 50 ms of data is lost during the switch operation, then it doesn't matter what, if anything, is dropped onto the PCM buses during the switch. This assumption allows some simplifications that are reflected in the circuit of FIG. 4. The preferred operation is to take one unit's provisioning from drop to protect before changing the other unit's provisioning from protect to drop. In the event that both units are provisioned to drop, the unit that was placed IS last (as resolved by the PST signals) is the unit that drops that VT. Knowing which unit is provisioned IS last, however, is not enough information since neither unit knows the other unit's instantaneous drop provisioning. In other words, the unit provisioned IS 'first' can not know whether to yield the dropping of a given VT unless it knows that the other unit is also provisioned to drop that VT. The RES signal is used to provide the resolution information. The unit provisioned IS last drives the RES line (active low) as an output (RESO) during each VT time slot that it is provisioned to drop. The other unit then yields if it sees the RESI signal low during a VT that it is also provisioned to drop.

The PABLE signal input to a unit experiences a two-clock delay due to the filtering circuit 10,12. This requires the per-VT failure indication to be sent two clock cycles prior to that VT's backplane time slot. A VT-specific failure is detected as receiving VT Path AIS (Alarm Indication Signal) or loss of VT pointer for that VT.

5. Degraded Signal Cases

The above span and Path protection switching cases address hard-failure cases where the data is lost. Spans and Paths can also encounter degraded conditions where the incoming signal has bit errors. When the bit-error rate (BER) exceeds a pre-specified threshold, a protection switch (either span or Path) must be performed. Protection switching associated with degraded conditions is best performed in software for the following reasons. First, when both spans/Paths suffer degraded conditions the system should select the least-degraded span/Path. Relative levels of degradation can either be calculated on the SCU or communicated as messages between processors on the interface units. This relative information is more difficult to transfer between the units with hardware over the two-wire interface. Second, the protection switch during degraded conditions is not as time-critical as during hard-failure conditions. A relatively long period of time is required to accumulate the bit errors and calculate whether the BER threshold has been exceeded. Also, the data is only degraded and not lost altogether. For these reasons, the invention uses the described hardware-oriented communication circuit to provide very-fast switching during hard failures and uses software to perform the more complicated and less time-critical tasks associated with switching in degraded conditions.

6. Layering

The protection mechanism presented here allows a layered implementation approach. The basic layer is the information conveyed by the PABLE signal lines (i.e., the units' ability to perform their functions). If the system software is constructed such that it never allows both units to be provisioned IS at the same time, the PST signals are not strictly necessary. In this case, the PST signals provide an additional layer of protection in the event that the IS unit fails in such a manner that it is unable to receive new provisioning (i.e., be re-provisioned to IS-STBY) and is unable to detect its own failure and take itself out of service. The PST signal provides a mechanism for removing the failed unit from its IS status in this rare situation. The system software's state transition timing can be simplified somewhat, however, if there is no need to prevent both units from being simultaneously provisioned IS. The PST signal in this case can become the normal mechanism to handle the exchange of IS status between units. The RES signal is only required for those situations where Path-switched rings are supported. Here again, if the system software never allows both units to be simultaneously provisioned to drop the same VT, there is no need for the RES signal. As with the PST signal in 1:1/1+1 cases, the RES line provides an additional layer of protection against rare failure events.

Similarly, when the RES signal is used, the system software's state transition timing is not as critical since the RES signal allows the hardware to resolve any conflicts.

While several embodiments and variations of the present invention for a mechanism for 1:1, 1+1, and UPSR path-switched protection switching are described in detail herein, it should be apparent that the disclosure and teachings of the present invention will suggest many alternative designs to those skilled in the art.

What is claimed is:

1. A method for allowing an in-service working unit and a standby unit to protect each other in the event of a failure of the working unit, comprising:

a. each of the working unit and the standby unit outputs an input signal to the other unit on respectively a first line and a second line, wherein each unit outputs a first output signal when that unit is operable to perform its functions, and each unit outputs a second output signal when that unit is not operable to perform its functions;

b. each of the working unit and the standby unit outputs an input signal to the other unit on respectively a third line and a fourth line, wherein each unit outputs a third output signal when that unit is provisioned in-service, and each unit outputs a fourth output signal when that unit is not provisioned in-service.

2. A method as claimed in claim 1, wherein the working unit and the standby unit are connected wherein one standby unit is available to protect one working unit (1:1 configuration protection).

3. A method as claimed in claim 2, wherein the working unit and the standby unit are connected to protect each other in the event of a failure of a span connected to the working unit, and both the working unit and the standby unit are connected to separate spans, and both units send and receive nominally the same signal, and a receiving terminal can choose to receive data from either the working unit or the standby unit (1+1 configuration protection).

4. A method as claimed in claim 3, also used for path-switching, wherein a signal on a fifth line between the units is used to resolve potential provisioning conflicts, and wherein failures are signaled on the first or second line on a per-tributary basis in addition to unit and span failures.

5. A method as claimed in claim 4, wherein each unit responds only to its input signals, particularly input signals on span condition, provisioning messages from a system controller, and signals on that unit's first or second input line, signals on that unit's third or fourth input line, and the signal on the fifth line, whereby each unit does not require a state machine with a memory of previous states to perform its per-tributary provisioning functions.

6. A method as claimed in claim 4, wherein the fifth signal line ensures that both units do not contend for a system bus at the same time, and that both units do not drop simultaneously.

7. A method as claimed in claim 6, wherein each unit only requires knowledge of its own per-tributary drop provisioning.

8. A method as claimed in claim 3, wherein the working unit, upon detecting a span failure in a 1+1 configuration, checks the second line to determine whether the standby unit is operable to perform its functions, and
   a. if the standby unit is unable to perform its functions, then the in-service working unit indicates its failure state to the standby unit and places an alarm indication signal onto data buses,
   b. if the standby unit is operable to perform its functions, then the in-service working unit indicates its failure state to the standby unit through the first line and stops placing data onto a backplane, and stops transmitting data on shared metallic spans for 1:1 configurations, and the standby unit, upon detecting a failure of the working unit, begins placing data onto data buses, and transmits data on spans for a 1:1 configuration, and the standby unit notifies a system controller of the switch, and the system controller provisions the in-service unit to be in-service-standby and provisions the standby unit to be in-service.

9. A method as claimed in claim 3, wherein for revertive action for both 1:1 and 1+1 configurations, after the failed working unit recovers or is replaced and is operable to perform its functions, or after the span failure clears, and the recovered or replaced unit informs the system controller that it is operable to perform its functions and a wait-to-restore timer is initiated and has expired, the system controller provisions the standby unit that went to in-service after the protection to be in-service-standby and provisions the recovered or replaced unit to be in-service again.

10. A method as claimed in claim 1, wherein the first and second output signals are complementary logic signals (0 or 1).

11. A method as claimed in claim 10, wherein the first signal is a low (0) signal and the second signal is a high (1) signal.

12. A method as claimed in claim 11, wherein the third signal is a low (0) signal and the fourth signal is a high (1) signal.

13. A method as claimed in claim 12, wherein to protect against transient conditions when provisioning of a unit is changed from in-service-standby to in-service, a unit delays for at least one clock period after asserting its third signal low before enabling itself to have its actual in-service state reset by the other unit.

14. A method as claimed in claim 13, wherein each unit filters out a one clock period wide high pulse on its input first or second line.

15. A method as claimed in claim 1, wherein each unit is responsible for detecting failures of the span which that unit receives, and is primarily responsible for detecting a fault within that unit's own hardware and software.

16. A method as claimed in claim 1, wherein each unit monitors its own bit error rate, and communicates the monitored bit error rate to the other unit, and when the bit error rate exceeds a threshold, the units can initiate a span or path protection switch.

17. A method as claimed in claim 1, wherein software of a system controller monitors the bit error rate of signals, and when the bit-error rate exceeds a threshold, initiates either unit or span protection switching.

18. A method as claimed in claim 1, wherein the standby unit, which is operable to perform its functions and capable of switching over for the working unit with a failure, does so immediately after receiving a failure indication from the working unit, and the working unit drops off-line immediately after indicating its failure to a standby unit that indicates it is operable to perform its functions and available for the switch.

19. A method as claimed in claim 18, wherein the standby unit, upon switching over, notifies a system controller of the switch, and system software of the system controller then reprovisions the standby unit to be in-service and reprovisions the failed working unit to be either in-service standby or out of service, depending upon the nature of the failure.

20. A method as claimed in claim 19, wherein the system controller, upon detecting the failure or removal of a working unit, sends a message to the failed working unit to inform it that it is being protected and to switch that unit from an in-service to an out-of-service state, and commands the failed working unit to go off-line and stop transmitting data on data buses and to disconnect itself from its metallic interface, and the system controller transmits a message to the standby unit to disconnect the failed working unit from metallic span interface signals and connect its own circuits to the metallic span interface signals, if both units share the same span, and begin transmitting data over the data buses.

21. A method as claimed in claim 18, wherein the working unit, upon detecting its own failure, indicates its failure state to the standby unit and stops placing all data onto a backplane and stops transmitting data on data buses, and the standby unit begins placing data onto the data buses and notifies a system controller of the switch, and the system controller provisions the working unit to be in-service-standby and provisions the standby unit to be in-service.

22. A method as claimed in claim 21, wherein the system controller initiates the wait-to-restore timer.

23. A method as claimed in claim 21, wherein the standby unit initiates the wait-to-restore timer.

24. A method as claimed in claim 1, wherein the third and fourth lines ensure that the last unit to be provisioned in-service will always become the active in-service unit, such that a failed unit can always be removed from in-service.

25. A method as claimed in claim 1, wherein the first and second lines cover span failure, unit failure, and unit removal.

26. A method as claimed in claim 1, wherein the third and fourth lines provide an additional layer of protection wherein a system controller controls provisioning of the units.

* * * * *